2,089,160

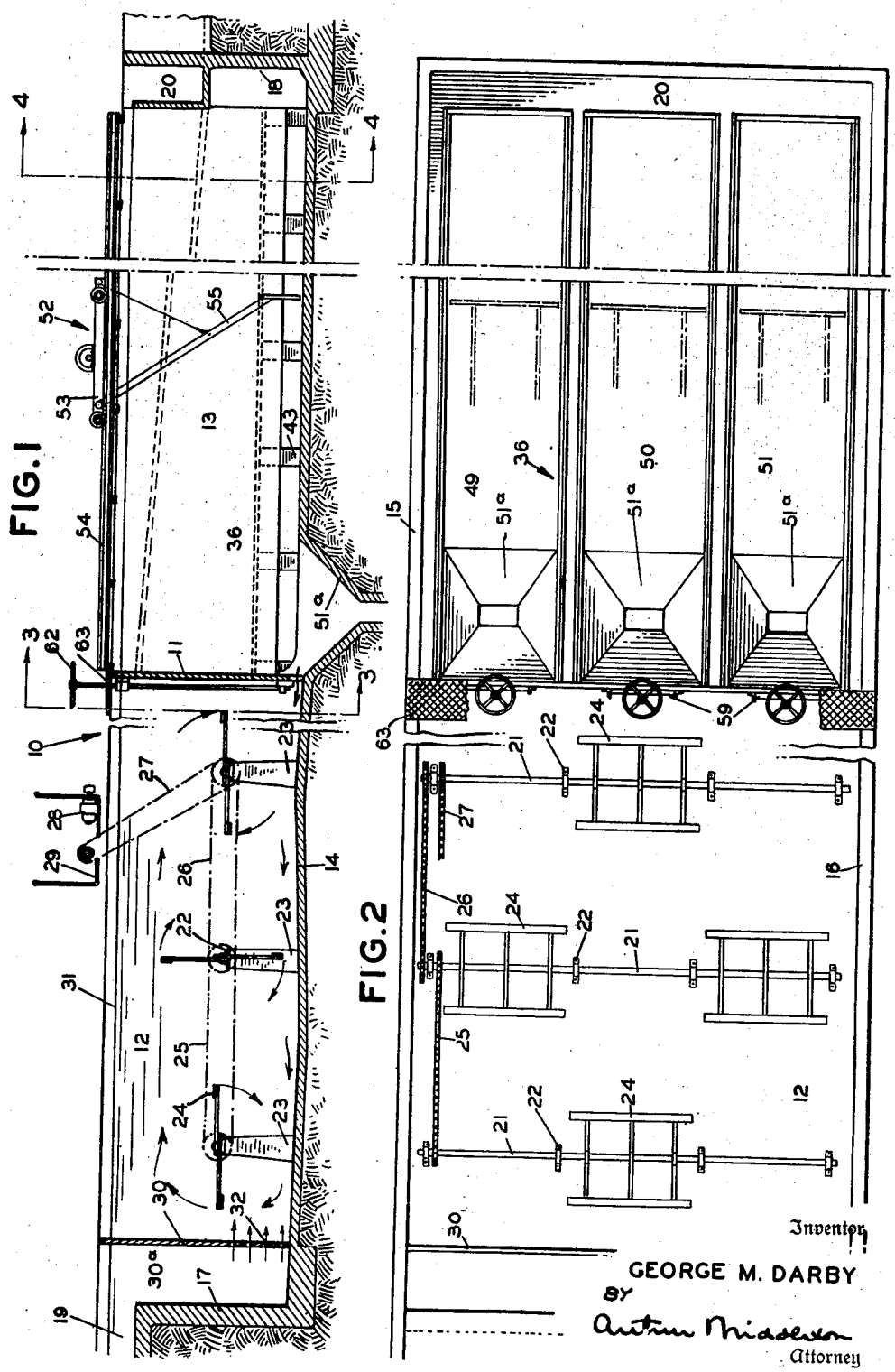
Aug. 3, 1937.  G. M. DARBY  2,089,160
PURIFICATION OF LIQUIDS
Original Filed March 23, 1935  2 Sheets-Sheet 1
Inventor
GEORGE M. DARBY
BY
Arthur Middleton
Attorney Aug. 3, 1937.    G. M. DARBY    2,089,160
PURIFICATION OF LIQUIDS
Original Filed March 23, 1935    2 Sheets-Sheet 2
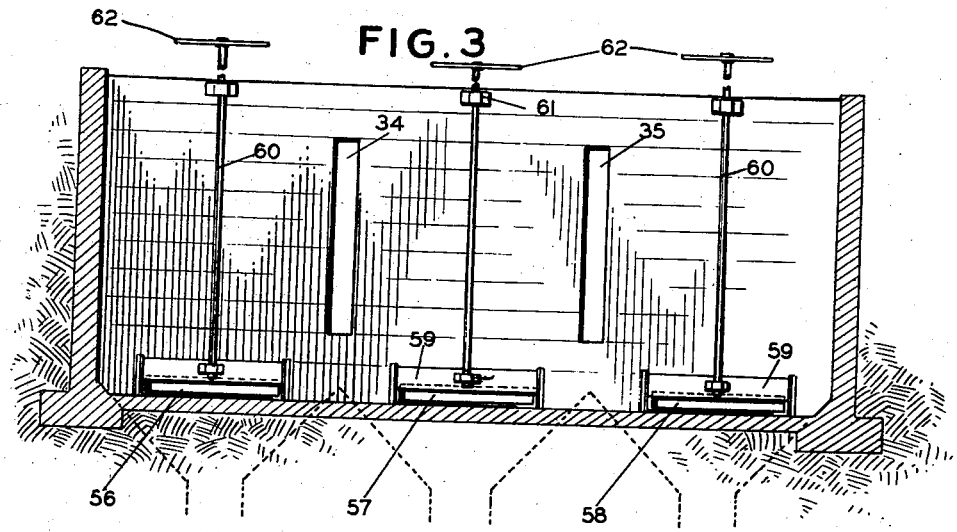
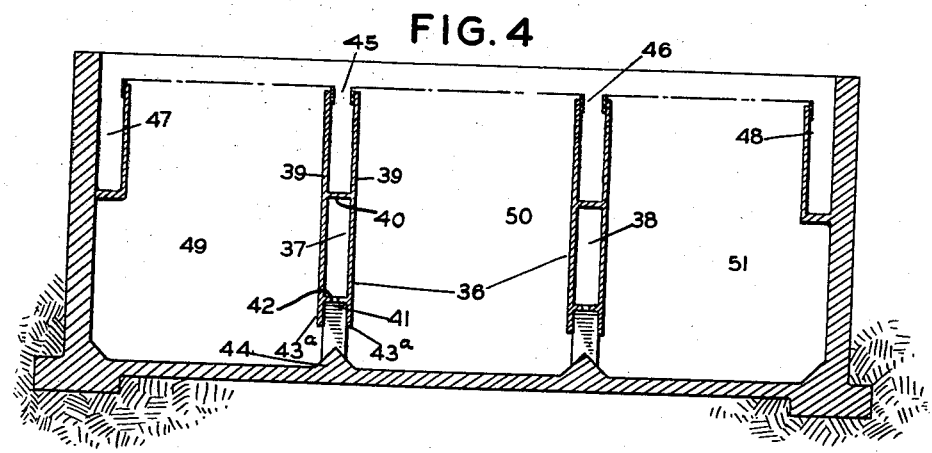
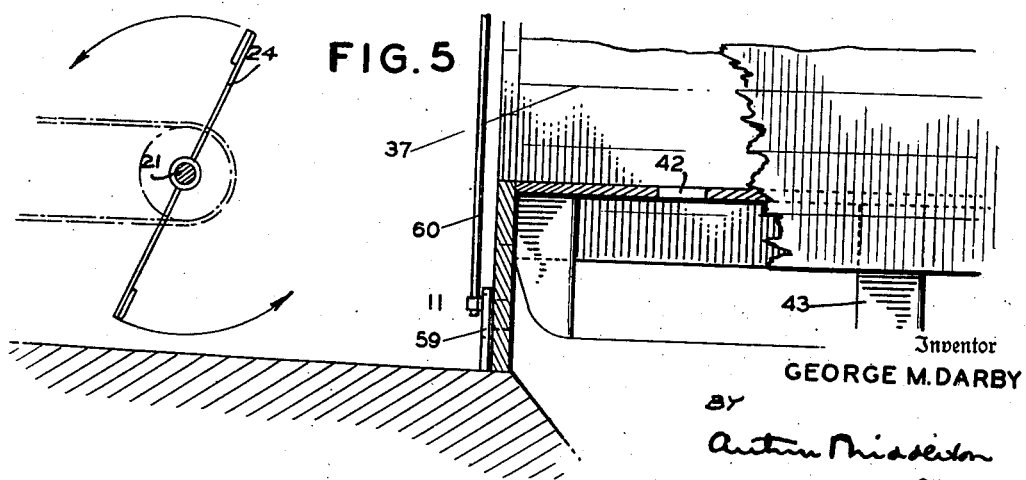
Inventor
GEORGE M. DARBY
BY
Austin Middleton
Attorney Patented Aug. 3, 1937

UNITED STATES PATENT OFFICE 2,089,160

PURIFICATION OF LIQUIDS

George M. Darby, Westport, Conn., assignor to The Dorr Company, Inc., New York, N. Y., a corporation of Delaware Original application March 23, 1935, Serial No. 12,613. Divided and this application March 27, 1937, Serial No. 133,319

2 Claims. (Cl. 210—16)

This invention relates to the clarification of turbid liquids and more specifically to the removal of solids from liquids by flocculation of the suspended solids and their subsequent sedimentation, the liquids so treated may be water, sewage, trade-wastes, chemicals and indeed any liquid from which it is desired to remove solids.

More specifically this relates to improvements in a unit used for the purification of liquids, which unit comprises a section for the coagmentation of solids kept in mobilized suspension by agitation into settleable flocs and a section for the sedimentation thereof; and it also relates to an improved manner of operating such a unit with regard to the handling therein and removal of the settled sludge.

The apparatus contemplated by this invention is of the type in which the flocs produced in the agitating operating section may pass directly into the sedimentation operating section without the use of transfer piping or such flow constrictions as may cause damage to the flocs in view of the difficulty of causing flocs once broken to be re-formed into something like their initial structure. Consequently, the apparatus herein contemplated is of the type in which the liquid to be purified flows in a general horizontal direction through a horizontal sequence of a substantially agitated flocculating section and a substantially quiescent sedimentation section.

From a more specific angle, the apparatus herein considered constitutes an improvement over the patent to Smith No. 1,893,451. The patented arrangement discloses in substance a horizontal flow of liquid through a channel in the initial portion of which is established a zone of flocculation or floc coagmentation in which the liquid is agitated for instance by the use of agitators rotating about horizontal axes. The effect of the agitation according to this patent is such as to cause the setting up of a return current in the lower strata of the flocculation or agitation zone, and such as to cause the piling up of flocs or sludge deposits upon the bottom of the channel substantially at or past the point of current return.

The return current is operative to carry back some of the deposited flocs from the near side of the floc pile thereby making them automatically available for the purpose of seeding, that is to say to the end of improved or stimulated floc formation in the flocculation zone. In other words, in its disclosure, the above patent relies upon the spontaneous formation of the floc pile in order to make available a continuous supply of seed flocs for recirculation without necessitating the provision of separate or restricted return conduits, and incidentally it also relies upon the very bulk of the pile to form something in the way of a submerged partition between the flocculation and the sedimentation zone. To allow for cumulative sedimentation in this manner involves the necessity of periodic removal of the floc pile only after draining the basin, and of subsequent re-formation of the pile, but it also involves the risk of having the sludge turn septic as a result of too long a detention or stagnation.

One object of the present improvement is to provide means for making available at substantially all times a supply of everchanging non-septic flocs for recirculation without having to rely upon the spontaneous formation of the floc pile.

Another object is to make possible the continuous removal of floc deposits in excess of those required for recirculation, and without interfering with the operation of floc recirculation or otherwise with the operation of the unit.

Another object is to improve the total efficiency of a combined flocculation-sedimentation unit of the type characterized above, by providing means which increase the individual operating efficiency of the respective flocculation- and sedimentation-sections of the unit yet without interfering with the proper and direct cooperation of both.

Still another object is to reduce or prevent an undue shortcircuiting of flocs from the flocculating zone into the sedimentation zone, and to insure sufficient detention of all flocs in the flocculating section of the unit.

In order to attain these ends the invention contemplates providing in the unit or tank a subdividing, or partitioning, or baffling system or baffle wall structure for the control of the flow and other conditions desired in the respective operating sections of the unit, for the purpose of increasing individual sectional efficiency as well as total efficiency of the unit while maintaining the required close interconnection, cooperation, and coordination between the respective operating sections or operating zones thereof. Together with such a system the invention also contemplates the use of mechanical means to operate in the sedimentation section of the unit for the removal under submergence of the sludge therefrom.

More specifically, this contemplates the provision of a main dividing or partitioning means to extend transversely of the unit, and substantially delineating the flocculating zone as against the sedimentation zone, so as to render the respective sections substantially independent from each other with regard to the individually desired operating conditions for both.

According to one feature a baffle wall structure of the type and character herein contemplated defines substantially the transverse limits between these operating zones at the place of their abutment and is adapted to deter the transference of liquid under turbulent influences from the coagmentation zone to the quiescent sedimentation zone while permitting the drift to the sedimentation zone of settleable flocs.

According to another feature, the main dividing means or baffle member extends transversely of the horizontal unit or tank and in operative connection with the bottom thereof so as to form a backing for insuring the retention of flocs to be available as a supply for the purpose of recirculation as by the return current induced in the lower strata of the flocculation section. On the other hand this dividing member is arranged to permit of the transfer of suspended excess and finished flocs into the settling range of the sedimentation section, from which the settled sludge may be removed by suitable means under submergence, and without affecting the first mentioned supply of flocs which in turn may be replenished by the everchanging supply of deposits.

Another feature provides baffle means to reduce or prevent an objectionable degree of short-circuiting of flocs from the flocculating zone to the sedimentation zone, which short-circuiting is tantamount to a loss of detention otherwise necessary for complete flocculation.

More specifically, these baffle means are arranged in such a way that no appreciable reaction from the agitating effect in the flocculating zone will be felt in the sedimentation zone, although there are provided suitable liquid passages for flocculated liquid to enter into the sedimentation zone.

Still another feature according to one embodiment provides for a controllable return of settled sludge from the sedimenation section into the flocculating section directly through a preferred partition member such as defines the two operating sections against each other. To this end closure controlled openings may be provided in the partition near the tank bottom, by virtue of which the return passage area for settled sludge may be varied.

In one embodiment of this invention the horizontally arranged flocculation-sedimentation unit or tank comprises a flocculating section in which is mounted a horizontal sequence of agitators rotatable about horizontal axes, or in which is provided any other suitable agitation producing means adapted to effect a mobilized suspension of the solids in said zone and the coagmentation thereof as by way of obtaining a multiude of gentle collisions therebetween to condition them into settleable flocs. A partition or transverse wall or baffle system marks the end of the flocculating section, while passages in the wall provide for the entry of the flocculated liquid into the sedimentation section of the unit by way of submerged longitudinally extending feed channels of suitable size connected with said passages. These submerged feed channels, while preventing direct disturbance from the agitation zone to reach the sedimentation zone, are moreover peculiarly effective to increase the volumetric efficiency of the sedimentation section proper. Suitable raking means may effect the continuous removal of settled flocs from the sedimentation section without the necessity of stopping the operation or draining the unit.

Consequently in this invention a relatively increased individual efficiency of the sedimentation section is coupled with an increased individual efficiency of the flocculating or floc coagmenting section, adding the advantage of a lessened amount of short-circuiting between both, of a lessened amount of relative disturbance between both, of an everchanging and controllable supply of flocs made available for recirculation, of individually controlled and essentially undisturbed independent operation of the respective operating sections of the unit without having to sacrifice a necessary close and direct cooperative relationship and interconnection, and finally the advantage of a relative saving in space or apparatus volume due to the cumulative effect of the aforementioned advantages.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

In particular it should be understood that for instance it is within the scope of this invention to modify the size or dimensions of the respective flocculating and sedimentation sections, as long as their general horizontal and endwise adjoining coordination is preserved.

The novel features that I consider characteristic of my invention are set forth with particularity in the appended claims. The invention, itself, however both as to its organization and its method of operation, together with additional objects and advantages thereof, will best be understood from the following description of a specific embodiment when read in connection with the accompanying drawings in which Fig. 1 shows a longitudinal sectional elevation of the flocculating-sedimentation unit.

Fig. 2 shows a plan view of the unit.

Fig. 3 shows a cross section taken upon Fig. 1 along the line 3—3.

Fig. 4 shows a cross section taken upon Fig. 1 along the line 4—4.

Fig. 5 shows an enlarged detail taken from Fig. 1, of the central lower portion of the unit, showing parts of the novel baffle system. It is a partial longitudinal vertical sectional view taken through the center of the channel 37.

In Fig. 1 is indicated a unit 10 for the clarification of turbid liquids, substantially consisting of a tank or horizontal channel subdivided by a wall or partition 11 into a flocculating or solids coagmenting section 12 and a sedimentation section 13. The tank consists substantially of the bottom 14, the side walls 15 and 16, the influent end 17, and the effluent end 18. The influent proper is shown at 19, the effluent being indicated by the transverse effluent launder 20 at the opposite end of the tank unit 10.

The flocculating section 12 in the embodiment shown is provided with an agitating mechanism comprising for instance a series of transverse agitator shafts 21 mounted in bearings or journals 22 carried upon supporting members 23 rising from the bottom of the tank. Each agitator shaft 21 carries a series of agitator paddles 24 shown in staggered arrangement. The agitator shafts are operatively interconnected through a driving arrangement comprising the chains 25 and 26 and corresponding sprockets, and a main driving chain 27 deriving power from a motor arrangement 28 shown to be mounted upon a platform 29.

Between the influent 19 and the first agitator shaft 21 is interposed a baffle wall 30 extending transversely of the tank and of the general longitudinal flow-direction therein, the wall 30 rising from the tank bottom to a point above the liquid level which latter is indicated at 31. In its lower portion and upwardly about as high as the elevation of the paddle shafts 21, the wall 30 is shown to be provided with holes or perforations 32 for the passage therethrough of the liquid. Between the baffle wall 30 and the end 17 of the tank is thus formed a chamber 30a in which pretreatment of the liquid such as dosing with a chemical or flocculant may take place, unless a special dosing device arrangement is provided ahead of the flocculator tank section. The partition or wall 11 which marks the ends of the flocculating section 12 is shown to have openings 34 and 35 (see Fig. 3) for the transfer therethrough of floc carrying liquid into the sedimentation section 13.

The sedimentation section 13 of the unit in one of the possible embodiments is equipped with a baffle system 36 (see Fig. 4) in the form of a plurality of submerged parallel channels 37 and 38 arranged to conduct liquid entering through the openings 34 and 35 respectively into the sedimentation section 13. The channels extend the length of the sedimentation section and distribute the liquid conducted therein accordingly along and over the bottom of the sedimentation section in a manner to effect efficient sedimentation as will hereinafter be seen. The distributing channels also act as baffles between which any agitation or commotion of the liquid is confined, thus leaving the settling space proper of the section 13 relatively undisturbed. However it should be understood that the transfer of liquid from the flocculation section 12 to the sedimentation section 13 may be effected in other ways, as by spreading the passage for the liquid substantially over the whole width of the tank.

Each channel structure 37 and 38 respectively comprises sidewalls 39, a top portion 40, and a bottom portion 41 having a series of outlet holes 42, the whole of the channel structure being spaced from the tank bottom by supporting members 43. The effective cross section of the channel carrying the incoming liquid tapers down from end to end of the sedimentation section 13. The outlet holes or openings 42 are flanked by depending skirts or portion 43a of the side walls of the channel structure, and are effective to direct the liquid issuing from the holes 42 downwardly towards the tank bottom.

Ridges 44 rise from the tank bottom below the outlet holes 42 to keep that portion of the bottom which lies just below the distributing channels 37 and 38 free from settled sludge. The sidewalls of each channel 37 and 38 respectively extend upwardly beyond the top wall 40 of the channel to form between them open overflow launders 45 and 46 respectively to terminate at right angles in the transverse effluent launder 20. Additional overflow launders are provided at 47 and 48 along the side walls 15 and 16 respectively.

The distributing channels 37 and 38 divide the sedimentation section into three strips or alleys 49, 50 and 51 (see Fig. 2), each of which is shown to have a hopper shaped sump 51a for sludge discharge. A sludge collecting device 52 is operable to convey the sludge over the bottom along the three alleys towards the respective sumps. The collecting device may be of substantially known design and include a carriage 53 operable for reciprocating motion along the top of the tank and upon track rails 54 mounted upon the sidewalls 15 and 16 respectively. A sludge scraper 55 depends from the carriage into each of the alleys 49, 50 and 51 and is selectively operable to convey the sludge in one-way fashion towards the respective sump for discharge.

Corresponding to the three alleys 49, 50, and 51 there are arranged sludge return passages in the partition 11 near the tank bottom at 56, 57, and 58 respectively. Their opening is controlled by gates or slides 59 actuated through spindles 60 guided in brackets 61, and handwheels 62 which can be manipulated from the top of the tank as indicated by a platform 63 extending across the tank (see Fig. 2).

*Operation*

A stream of liquid to be treated enters the flocculation-sedimentation unit 10 through the influent channel 19, to meet the baffle wall 30 which defines the chamber 30a in which the liquid might be dosed or conditioned with a suitable chemical to induce the initial coagulation of the suspended solids or impurities or in which to cause the formation of initial nuclei upon which settleable flocs can be built, if no special dosing and mixing arrangement is provided ahead of this section of the unit.

Through the openings 32 in the lower portion of the wall 30 the liquid passes on into the flocculating section 12 of the unit where it undergoes agitating treatment by the agitators 24 rotating in the direction shown by arrows. Agitation is imparted in this manner to the solids carrying liquid is basically known from the aforementioned patent to Smith No. 1,893,451, according to which the paddles when rotating in the direction shown cause a stream of returning liquid to flow in the lower or bottom strata of the liquid body from the outlet end of the flocculating section to the inlet end hereof. In other words this causes a transference of flocculated solids as from the exit towards the entrance of the flocculating section. However, it should be understood that any other suitable kind of agitation can be employed that is adapted to produce a state of mobilized suspension of the solids whereby the same are formed into settleable flocs. Since the partition or endwall 11 of the flocculating section intercepts and detains a certain amount of flocs prior to their continued passage into the sedimentation section 13 of the unit, this partition insures the supply of an adequate amount of flocs for recirculation, and it obviates an undesirable amount of short-circuiting.

Consequently a high average of suitably sized flocs enters the sedimentation section 13 by way of openings or passages such as 34 and 35 respectively.

The function of the dividing baffle wall 11 or else of the baffle system herein disclosed is of importance with respect to the operation of each of the two main sections per se of the unit as well as with respect to their operative relationship. In the specific field of liquid clarification as herein contemplated the suspended solids causing the turbidity require for their coagmentation a kind of agitation whereby there is established a state of mobilized suspension of the solids, which brings about the coagmentation of the solids into flocs of settleable size and density. The phase of transferring the flocs thus formed from the agitation section into the sedimentation section is equally of importance since the individual flocs as obtained should not to any objectionable or appreciable degree become disrupted or disintegrated before having had a fair chance to settle freely in a zone of quiescence. For this reason the baffle wall structure according to this invention, defining the limits between the two operating zones, is designed and adapted to deter the transference of liquid under turbulent influences from the coagmentation zone while permitting the drift thereto of suspended settleable flocs.

The baffle wall 11 also can be said to include a flow intercepting baffle portion extending from below to above the liquid level, and by virtue of which there is prevented the short-circuiting of solids which in particular may take place in the top strata of the liquid under treatment.

It appears that the baffle structure when interposed between the operating zones as contemplated by this invention, accentuates and renders substantially independent from each other and undisturbed by each other the respective individual functions of these operating zones, yet without adversely affecting their required cooperative relationship.

In this connection it is also to be noted that in the operation of this clarifying unit, taking as an example the case of water treatment, the agitation in the coagmentation section is to be carried on in such a manner that normally no deposits will be retained therein long enough to go septic or to permit algae to grow on the sludge particles. On the other hand it is observed that the deposit or sludge in the sedimentation section can be removed without undue delay by virtue of a suitable and for instance automatic sludge conveying and removal device.

With the partition 11 interposed between the flocculation- and the sedimentation-section of the unit, the paddles are free to be operated at a speed to produce the flocculating phenomena desired, without appreciably interfering with the quiescence which is necessary in the sedimentation section 13 of the unit. Any possible interference between agitation and sedimentation is furthermore effectively avoided by the channel structure 36 which acts in the way of a baffle system as well as a distributor and it is herein to be considered in both these capacities. That is to say as a baffle system it prevents to a high degree any interference between the divergent operating requirements of the two sections 12 and 13. As a feed distributing means it raises the settling efficiency proper of the section 13 over settling devices ordinarily known, as will be presently explained. From a more general point of view it makes possible the organic, harmonious, and convenient combination of the flocculating section of the preferred type with the sedimentation section into a compact horizontally extending longitudinal channel or purification unit. The cross section of the distributing channels 36 tapers down (as seen in Figs. 1, 3 and 4) in accordance with the diminishing quantities of liquid passing through the respective portions thereof. That is to say the volume of the stream passing through the channel diminishes as the liquid discharges through the series of openings 42 in the bottom of the channels 37 and 38 respectively.

In this way the liquid is discharged above the ridges 44, and the solids or flocs are guided downwardly between the skirts 43a, as closely as practical to the bottom of the tank where they settle, while the carrier liquid is allowed to rise in a more or less vertical direction along the shortest possible line to the respective overflow launders 45, 46, 47 and 48. In other words, a relatively high settling efficiency is attained with a minimum of ground space by expanding, distributing or spreading the feed along the tank bottom through the channels 37 and 38, and then allowing for upward flow of the liquid from the distributing channel to the overflow launders substantially transversely of the longitudinal shape of the sedimentation section of the unit.

Without necessitating the shutdown or drainage of the unit, the settled sludge may be continually removed by the operation of the sludge raking members 55 as the carriage 52 is caused to reciprocate over the length of the sedimentation- or tank-section 13 in an otherwise obvious manner, pushing the sludge into the respective sumps, hoppers or outlets 51a. The transverse launder 20 collects the overflow from the longitudinal launders 45, 46, 47 and 48 and leads to exit.

Sludge return from the sedimentation section 12 to the flocculation section 13 operates through the openings 56, 57 and 58 and may be controlled by way of the handwheels 62 from the top of the tank. That is to say there is normally assumed to be present a layer of thickening sludge upon the bottom of the section 13, and which may also keep the sumps 51a filled so that the specifically heavy sludge will have a tendency to penetrate by virtue of its very density through the openings 56, 57, 58 into the flocculating section 12 in an amount controlled by the gate adjustment, when it will be caught in the return current previously described to be mingled with fresh, nascent, and growing flocs.

This case has been carved or divided out from my patent application Ser. No. 12,613 filed March 23, 1935 and the subject matter claimed herein differs from that claimed therein by the inclusion of features revolving around the manner of feeding the flocculated liquid to the sedimentation section.

I claim:

1. A clarification unit in the nature of a horizontally extending tank arrangement comprising a flocculating section and a sedimentation section both endwise associated and operating in series, characterized by a partition having an aperture below the liquid level, an inverted channel-like baffle extending substantially horizontally from said aperture and effective to conduct flocculated liquid from the flocculating zone in a submerged stream along and over the bottom of the sedimentation section, with the addition of means associated with said channel-like baffle to effect a desired distribution of the stream passing therealong over the length of and into said sedimentation zone, and overflow means extending along said sedimentation section and substantially parallel to said channel-like baffles.

2. A clarification unit in the nature of a horizontally extending tank arrangement comprising a flocculating section and a sedimentation section both endwise associated and operating in series, characterized by a partition extending between the flocculation- and the sedimentation-section, said partition having an aperture below the liquid level, an inverted channel-like baffle extending substantially horizontally from said aperture and effective to conduct flocculated liquid from the flocculating zone in a submerged stream along and over the bottom of the sedimentation section, with the addition of means associated with said channel-like baffle to effect a desired distribution of the stream passing therealong over the length of and into said sedimentation zone, overflow means extending along said sedimentation section and substantially parallel to said channel-like baffles, and reciprocable sludge collecting means operable from the top of the sedimentation section, and discharge means for the collected sludge.

GEORGE M. DARBY.